US009609012B2

(12) United States Patent
Davis et al.

(10) Patent No.: US 9,609,012 B2
(45) Date of Patent: *Mar. 28, 2017

(54) DETECTION OF INFECTED NETWORK DEVICES AND FAST-FLUX NETWORKS BY TRACKING URL AND DNS RESOLUTION CHANGES

(71) Applicant: The Boeing Company, Chicago, IL (US)

(72) Inventors: Aaron R. Davis, Bellevue, WA (US); Timothy M. Aldrich, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,501

(22) Filed: Feb. 12, 2016

(65) Prior Publication Data
US 2016/0173519 A1    Jun. 16, 2016

Related U.S. Application Data

(63) Continuation of application No. 14/031,050, filed on Sep. 19, 2013, now Pat. No. 9,270,693.

(51) Int. Cl.
H04L 29/06 (2006.01)
H04L 29/12 (2006.01)

(52) U.S. Cl.
CPC ...... H04L 63/1425 (2013.01); H04L 61/1511 (2013.01); H04L 63/0227 (2013.01);
(Continued)

(58) Field of Classification Search
CPC ............ H04L 63/1416; H04L 63/1425; H04L 63/1441; H04L 63/0227; H04L 61/1511; H04L 63/168; H04L 2463/144
See application file for complete search history.

(56) References Cited

U.S. PATENT DOCUMENTS 7,305,708 B2   12/2007  Norton et al.
7,903,566 B2   3/2011   Knapp et al.
(Continued)

FOREIGN PATENT DOCUMENTS

WO   2009/155453   12/2009

OTHER PUBLICATIONS

Perdisci, Roberto et al., "Early Detection of Malicious Flux Networks via Large-Scale Passive DNS Traffic Analysis", IEEE Transactions on Dependable and Secure Computing, vol. 9, No. 5, Sep./Oct. 2012, pp. 714-726.*
Martinez-Bea, Sergi et al., "Real-time Malicious Fast-flux Detection Using DNS and Bot Related Features", 2013 Eleventh annual international conference on privacy, security and trust (PST); 2013 4 pages.*

(Continued)

Primary Examiner — Michael Pyzocha
(74) Attorney, Agent, or Firm — McDonnell Boehnen Hulbert & Berghoff LLP

(57) ABSTRACT

A system and method for detecting Fast-Flux malware are presented. Domain name system (DNS) lookup requests to DNS servers from a local area network (LAN) to a wide area network (WAN) are monitored. The DNS lookup requests comprise requests to resolve uniform resource locators (URLs) to network addresses. The network addresses (IP) received from the DNS servers for the DNS lookup requests are monitored provide a URL-to-IP associations list. The DNS servers used for the DNS lookup requests for the URLs are monitored to provide a DNS Domain-to-DNS server associations list. A suspicious URL log based on the URL-to-IP associations list, and a suspicious DNS log based on the DNS Domain-to-DNS server associations list are generated.

20 Claims, 9 Drawing Sheets

(52) U.S. Cl.
CPC ...... *H04L 63/1416* (2013.01); *H04L 63/1441* (2013.01); *H04L 63/168* (2013.01); *H04L 2463/144* (2013.01)

(56) References Cited

U.S. PATENT DOCUMENTS

| | | | |
|---|---|---|---|
| 7,995,496 B2 | 8/2011 | Knapp et al. | |
| 8,260,914 B1 | 9/2012 | Ranjan | |
| 8,347,394 B1 | 1/2013 | Lee | |
| 8,474,043 B2 | 6/2013 | Sturges et al. | |
| 8,539,577 B1 | 9/2013 | Stewart et al. | |
| 8,561,188 B1* | 10/2013 | Wang | H04L 63/1425 713/176 |
| 8,713,676 B2 | 4/2014 | Pandrangi et al. | |
| 8,904,524 B1 | 12/2014 | Hodgman | |
| 9,178,901 B2* | 11/2015 | Xue | H04L 63/1425 |
| 9,270,693 B2 | 2/2016 | Davis et al. | |
| 2010/0235915 A1 | 9/2010 | Memon et al. | |
| 2011/0185425 A1 | 7/2011 | Lee et al. | |
| 2012/0054869 A1 | 3/2012 | Yen et al. | |
| 2012/0084860 A1* | 4/2012 | Cao | H04L 63/1441 726/23 |
| 2012/0158626 A1 | 6/2012 | Zhu et al. | |
| 2012/0278889 A1 | 11/2012 | El-Moussa | |
| 2012/0303808 A1 | 11/2012 | Xie | |
| 2013/0014253 A1 | 1/2013 | Neou et al. | |
| 2013/0031625 A1 | 1/2013 | Lim | |
| 2013/0232574 A1 | 9/2013 | Carothers | |

OTHER PUBLICATIONS

Caglayan, Alper et al., "Real-Time Detection of Fast Flux Service Networks", Cybersecurity Applications & Technology Conference for Homeland Security, 2009 IEEE, pp. 285-292.*
Perdisci, Roberto et al., "Detecting Malicious Flux Service Networks through Passive Analysis of Recursive DNS Traces", 2009 Annual Computer Security Applications Conference, pp. 311-320.*
Holtz, Thorsten et al., "Measuring and Detecting Fast-Flux Service Networks", Internet Society—ISOC—: 15th Network and Distributed System Security Symposium, NDSS 2008. Proceedings : Feb. 10-13, 2008, San Diego, California, 12 pages.*
Extender European Search Report and Written Opinion EP14179332.3 mailed on Oct. 28, 2014.
Hsu et al., "Fast-Flux Bot Detection in Real Time," RAID 2010, LNCS 6307, pp. 464-483.
Passerini et al., "FluXOR: detecting and monitoring fast-flux service networks," DIMVA 2008, LNCS 5137, 20 pages.
Perdisci R et al: "Detecting Malicious Flux Service Networks through Passive Analysis of Recursive DNS Traces", Computer Security Applications Conference, 2009. ACSAC '09. Annual, IEEE, Piscataway, NJ, USA, Dec. 7, 2009 (Dec. 7, 2009), pp. 311-320, XP031610276, ISBN: 978-0-7695-3919-5 p. 311-p. 316.
Wikipedia: "Domain Name System", Aug. 29, 2013 (Aug. 29, 2013), XP002731201, Retrieved from the Internet: URL: http://en.wikipedia.org/w/index.php?title=Domain_Name_System&oldid=570707000 [retrieved on Oct. 14, 2014], the whole document.

* cited by examiner

600

| ID | QUERYING IP | URL | URL RESOLVED IP | DOMAIN | AUTHORITATIVE DNS SERVER IP | QUERY TIME |
|---|---|---|---|---|---|---|
| 4 | 10.10.10.10 | www.xample.com | 2.2.2.2 | *.xample.com | 1.1.1.1 | 2011-11-03T13:01:11Z |
| 3 | (null) | www.page.business.name.com | 4.4.4.4 | *.business.name.com | 5.5.5.5 | 2011-11-03T13:01:11Z |
| 2 | 10.11.12.13 | www.test.com | 1.2.3.4 | (null) | (null) | 2011-11-03T13:01:11Z |
| 1 | (null) | (null) | (null) | *.com | 1.0.0.5 | 2011-11-03T13:01:11Z |

| ID | URL | START TIME | END TIME | TIME LOGGED |
|---|---|---|---|---|
| 501 | www.xample.com | 2013-01-03T13:01:11Z | 2013-02-03T13:01:11Z | 2011-02-03T15:01:11Z |

| ID | DNS DOMAIN | START TIME | END TIME | TIME LOGGED |
|---|---|---|---|---|
| 101 | *.xample.com | 2013-01-03T13:01:11Z | 2013-02-03T13:01:11Z | 2022-02-03T15:01:11Z |

FIG. 8

DETECTION OF INFECTED NETWORK DEVICES AND FAST-FLUX NETWORKS BY TRACKING URL AND DNS RESOLUTION CHANGES

CROSS-REFERENCE TO RELATED APPLICATIONS

This patent application is a continuation of U.S. application Ser. No. 14/031,050, filed on Sep. 19, 2013, the contents of which are fully incorporated herein by reference for all purposes.

FIELD

Embodiments of the present disclosure relate generally to detection of threats in network devices. More particularly, embodiments of the present disclosure relate to detecting Advanced Persistent Threats.

BACKGROUND

On a company network where there may be valuable assets to be protected, many techniques and software and hardware solutions are employed to prevent the loss of those valuable assets, but the current solutions have proven ineffective at stopping the infiltration and exfiltration attempts of intellectual property and data. One technique used by attacking hackers, commonly referred to as Advanced Persistent Threats (hereafter referred to as "APT" or "APTs"), is to infect a target machine by some mechanism to install malware to perform actions on behalf of the attacking hacker. The APT will then begin to "call out" or "beacon" to a host or list of hosts on the internet on a recurring basis.

A purpose of these callouts is to get through firewalls (which tend to prevent much incoming traffic but allow most outgoing traffic) and allow the attacker to instruct or control the victim device to carry out actions such as surveying other systems, collecting data from the infected system, further infiltrating the network, and sending information back to the attacker. Attackers have over time evolved better techniques for performing this call-back so that it is more difficult to catch where infected hosts may be attempting to connect to.

One of the most advanced current techniques uses techniques referred to as "Fast-Flux" network systems for avoiding detections. Existing systems do not effectively identify Uniform Resource Locators (URLs) that frequently change Internet Protocol (IP) addresses or changing authoritative Domain Name System (DNS) servers. The existing systems generally use pre-defined lists of known suspicious URLs, IPs or Domain Name System to perform detections.

SUMMARY

A system and methods for detecting Fast-Flux malware are presented. Domain name system (DNS) lookup requests to DNS servers from a local area network (LAN) to a wide area network (WAN) are monitored. The DNS lookup requests comprise requests to resolve uniform resource locators (URLs) to network addresses. The network addresses received from the DNS servers for the DNS lookup requests are monitored to provide a URL-to-IP associations list. The authoritative DNS servers used for the DNS lookup requests for the URLs are monitored to provide a DNS Domain-to-DNS server associations list. A suspicious URL log based on the URL-to-IP associations list and a suspicious DNS log based on the DNS Domain-to-DNS server associations list are generated.

In this manner, embodiments of the disclosure use only algorithms to determine suspicious behaviors which allows for previously unknowingly bad URLs, internet protocol addresses (IPs), or DNS servers to be identified. Embodiments address a gap in current security monitoring and analysis systems and aims to identify Single-Flux and Double-Flux networks of the Fast-Flux network with a purpose of identifying internally infected network devices, which is a task that is not being performed by any service and system today. Embodiments of the disclosure detect APT computer malware by examining and tracking URL-to-IP resolution requests as well as the authoritative DNS servers which are providing the URL resolutions.

There may be expected to be many DNS servers in a DNS resolution chain which may be used, and many may not be known (e.g., as they may generally not be provided in a URL resolution response), but ones of interest are the authoritative DNS servers. By looking for changes in pairings, URL-to-IP and DNS Domain-to-DNS server embodiments identify the URLs and DNS servers most likely involved in a Fast-Flux malware network. Filters and control parameters are applied to this identification process to limit a number of false positive detections, and detected cases are used to identify network devices that may have been compromised.

In an embodiment, a method for detecting Fast-Flux malware monitors domain name system (DNS) lookup requests to DNS servers from a local area network (LAN) to a wide area network (WAN). The DNS lookup requests comprise requests to resolve uniform resource locators (URLs) to received network addresses (IP). The method further monitors the received network addresses (IP) received for the URLs from the DNS servers for the DNS lookup requests to provide a URL-to-IP associations list, and monitors the DNS servers used for the DNS lookup requests for the URLs to provide a DNS Domain-to-DNS server associations list. The method further generates a suspicious URL log based on the URL-to-IP associations list and a suspicious DNS log based on the DNS Domain-to-DNS server associations list.

In another embodiment, a system for detecting Fast-Flux malware comprises a network traffic monitor and a malware detector. The network traffic monitor monitors domain name server (DNS) lookup requests to DNS servers from a local area network (LAN) to a wide area network (WAN). The DNS lookup requests comprise requests to resolve uniform resource locators (URLs) to received network addresses (IP). The network traffic monitor further monitors the received network addresses (IP) received from the DNS servers for the DNS lookup requests to provide a URL-to-IP associations list, and monitors the DNS servers used for the DNS lookup requests for the URLs to provide a DNS Domain-to-DNS server associations list. The malware detector generates a suspicious URL log based on the URL-to-IP associations list and a suspicious DNS log based on the DNS Domain-to-DNS server associations list. The malware detector also indicates a presence of a malware program in the LAN based on the suspicious URL log and the suspicious DNS log.

In a further embodiment, a non-transitory computer readable storage medium comprising computer-executable instructions for detecting Fast-Flux malware. The computer-executable instructions monitor domain name server (DNS) lookup requests to DNS servers from a local area network (LAN) to a wide area network (WAN). The DNS lookup requests comprise requests to resolve uniform resource locators (URL)s to received network addresses (IP). The computer-executable instructions further monitor the received network addresses (IP) received from the DNS servers for the DNS lookup requests to provide a URL-to-IP associations list. The computer-executable instructions further monitor the DNS servers used for the DNS lookup requests for the URLs to provide a DNS Domain-to-DNS server associations list. The computer-executable instructions further generate a suspicious URL log based on the URL-to-IP associations list and a suspicious DNS log based on the DNS Domain-to-DNS server associations list.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 6 is an illustration of an exemplary table showing possible raw storage results for use with Fast Flux and Double Flux tracking according to an embodiment of the disclosure.

FIG. 7 is an illustration of an exemplary table showing data in a suspicious URLs storage according to an embodiment of the disclosure.

FIG. 8 is an illustration of an exemplary table showing data in a suspicious DNS domain storage according to an embodiment of the disclosure.

DETAILED DESCRIPTION

Figure 1:
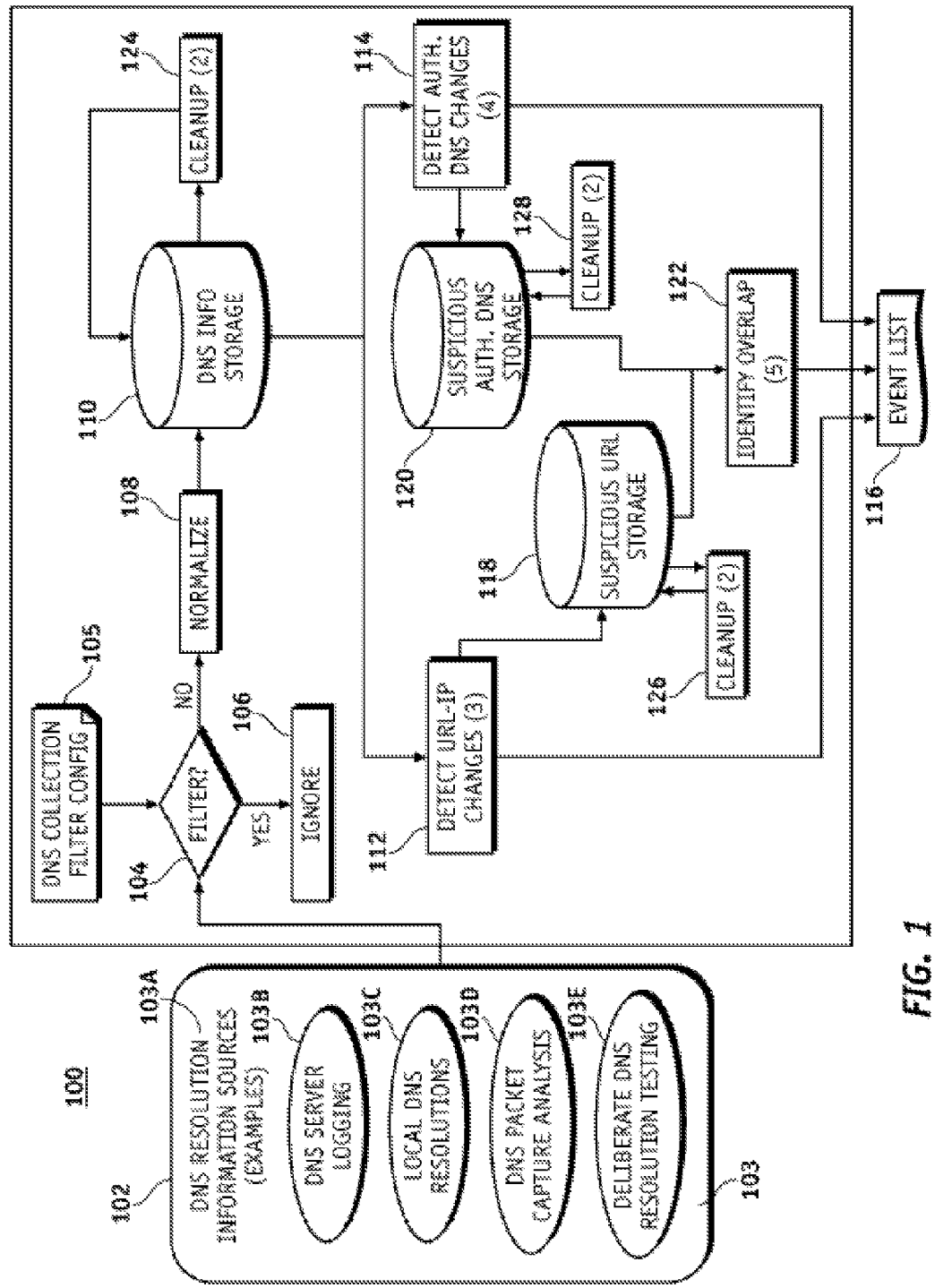
FIG. 1 is an illustration of an exemplary flowchart showing a Fast-Flux malware detection process according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to signal processing, network and data communication, the Internet, Local Area Network (LAN), Wide Area Network (WAN), and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of some non-limiting applications, namely, client. Embodiments of the disclosure, however, are not limited to such applications, and the techniques described herein may also be utilized in other applications. For example but without limitation, embodiments may be applicable to cloud services, cyber-security services, or other internet communication.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

The Domain Name System (DNS) is a standard technology for managing the names of Web sites and other Internet domains. DNS technology allows a user to type names into the user Web browser like "compnetworking.about.com" and the user computer to automatically find that address on the Internet. An important element of the DNS is a worldwide collection of DNS servers. A DNS server is any computer registered to join the Domain Name System. A DNS server runs special-purpose networking software, features a public IP address, and contains a database of network names and addresses for other Internet hosts.

As mentioned above, attackers have over time evolved better techniques for performing call-backs so that it is more difficult to catch where infected hosts may be attempting to connect to. One of the most advanced current techniques uses techniques referred to as "Fast-Flux" and may comprise a "Single-Flux" and/or a "Double-Flux" network system for avoiding detections. Embodiments of the disclosure detect these Single-Flux and Double-Flux systems. These Flux networks work by using DNS networks to resolve URL values to IP addresses. Infected hosts do not need to have IP addresses pre-programmed, instead the URL or URL list remains static while the IP address that it resolves to can change on a regular and sometimes rapid basis.

A simplest type of Fast Flux, named "Single-Flux", is characterized by multiple individual nodes within a network registering and de-registering their addresses as part of the DNS (address) record list for a single DNS name. This combines round robin DNS with a short (e.g., less than five minutes (300 s)) time-to-live (TTL) values to create a constantly changing list of destination addresses for that single DNS name. The list can be hundreds or thousands of entries long. A time frame that the TTL values will change may be difficult to determine, and isn't necessarily this short. A frequency of change may be significant.

A more sophisticated type of Fast-Flux, referred to as "Double-Flux", is characterized by multiple nodes within the network registering and de-registering their addresses as part of the DNS Name Server record list for the DNS zone. This provides an additional layer of redundancy and survivability within a malware network.

Double-Flux systems resolve entire domains, and change the DNS server resolution to further increase volatility of a communication line, allowing more servers to participate in a command and control structure. A complexity and robustness of this communication structure makes it extremely difficult for network administrators and security personnel to identify infected devices which may be using this form of communication. Additionally, web and DNS traffic is often entirely overlooked by security personnel due to the volume and frequency that it occurs. Embodiments of the disclosure, address a problem of not being able to identify these infected devices by tracking URL-to-IP and DNS Domain-to-DNS server pairs and changes that they undergo, attempting to identify a communication system (i.e., identification of suspect URLs and DNS domains) that an infection uses so that infected devices can then be tracked and cleaned.

Identification of infected devices is currently performed using largely signature-based detection and human-in-the-loop examination. A problem of communication through the use of Single-Flux (URL-IP) and Double-Flux (DNS Domain) networks is not addressed in existing systems. Firewalling and blocking of suspect IPs is done using standard firewalls, whereas blocking URLs and DNS can be performed using services such as WebSense™, however these services require one or more of: 1) A subscription to the WebSense™ service, which provides a list and groupings of various URLs and Domains, which then allow administrators to block or approve connections based on specific URLs or URL groupings, and 2) Manual input and tuning of a WebSense™ URL Filtering device, to add and/or remove specific URLs and domains. Additionally, tools such as WebSense™ (or other whitelist/blacklist URL filters) use a pre-defined URL name list. In contrast, Embodiments dynamically discover suspected URLs automatically.

Moreover, existing systems do not effectively identify URLs that frequently change IP addresses or change authoritative DNS servers. The existing systems generally use pre-defined lists of known suspicious URLs, IPs, or DNS Domains to perform detections. In contrast, embodiments of the disclosure use only algorithms to determine suspicious behaviors which allows for previously unknowingly bad URLs, IPs, or DNS Domains to be identified. As mentioned above, embodiments address a gap in current security monitoring and analysis systems and aims to identify Single-Flux and Double-Flux networks with the purpose of identifying internally infected network devices, which is a task that is not being performed by any service today.

Furthermore, the existing systems rely on security personnel to discover some anomaly prior to investigating beaconing attempts. Beaconing attempts are inherently difficult to find due to the amount of traffic data seen on a corporate-size network. In contrast, embodiments of the disclosure use automated algorithms to detect these suspicious URLs, IPs, and DNS Domains. Security personnel are difficult to train and employees are a relatively high expense. Often security personnel are overworked and don't have time to address non-critical issues, so finding possibly infected hosts takes a back seat to more imminent non-optimality. In this manner, embodiments of the disclosure provide a means for security personnel to identify the infected devices without having to spend time doing so themselves, reducing their overall workload while allowing them to spend time more judiciously and increasing security on a monitored network.

Additionally, the existing systems provide only ways to block access to problematic IP addresses and URLs, but do not address finding those problematic values. An existing technique requires subscriptions, licenses, and proprietary hardware, all which cost additional money, and which ultimately only provides a list of probable-cause values, without identifying either the Single-Flux or Double-Flux networks, or locally infected devices. The locally infected devices therefore are not cleaned of the infection, even if they are placated by an inability to communicate (and assuming that other communication methods aren't already in place as a command-and-control backup system).

As explained in more detail below, embodiments of the disclosure detect Fast-Flux computer malware by examining and tracking URL-to-IP resolution requests as well as the authoritative DNS servers which are providing the URL resolutions. By looking for changes in the pairings URL-to-IP, and DNS Domain-to-DNS server embodiments identify the URLs and DNS servers most likely involved in a Fast-Flux malware network. Filters and control parameters are applied to the Fast-Flux detection process to limit the number of false positive detections, and the detected cases are used to identify network devices that may have been compromised.

FIGS. 1-5 are illustrations of exemplary flowcharts showing Fast-Flux malware detection processes 100-500 according to an embodiment of the disclosure. The various tasks performed in connection with the processes 100-500 may be performed by software, hardware, firmware, a computer-readable medium having computer executable instructions for performing the process method, or any combination thereof. The processes 100-500 may be recorded in a non-transitory computer-readable medium such as a semiconductor memory, a magnetic disk, an optical disk, and the like, and can be accessed and executed, for example, by a computer CPU such as the processor module 906 (FIG. 9) in which the computer-readable medium is stored.

It should be appreciated that the processes 100-500 may include any number of additional or alternative tasks, the tasks shown in FIGS. 1-5 need not be performed in the illustrated order, and the processes 100-500 may be incorporated into a more comprehensive procedure or process having additional functionality not described in detail herein. In some embodiments, portions of the processes 100-500 may be performed by different elements of a Fast-Flux detection system 900 (FIG. 9) such as: a network traffic monitor 902, a malware detector 904, a processor module 906, a memory module 908, a communication module 910, etc. Processes 100-500 may have functions, material, and structures that are similar to the embodiments shown in FIGS. 1-5. Therefore common features, functions, and elements may not be redundantly described here.

FIG. 1 is an illustration of an exemplary flowchart showing a Fast-Flux malware detection process 100 according to an embodiment of the disclosure. Process 100 shows a high level Fast-Flux malware detection process 100, its expected inputs and outputs and the high level functionality of the Fast-Flux malware detection process 100.

Process 100 may begin by providing an input data such as the input data 103 (task 102). The input data 103 to the process 100 may comprise DNS resolutions information sources 103A (DNS resolution information 103A), which have occurred though some means. This information comprises most importantly an association of a URL to a specific internet IP address (URL-to-IP) as well as associations of DNS Domains to authoritative DNS servers (DNS Domain-to-DNS server). The input data 103 may be obtained, for example but without limitation, by logging the DNS queries and results 103B (DNS server logging 103B) from a localized DNS server (either on a local machine as in Local DNS resolutions 103C or a dedicated server on a regional network), performing analysis of DNS traffic from packet captures 103D (DNS packet capture analysis 103D) or performing automated, intentional DNS queries 103E (deliberate DNS resolution testing 103E) for URLs or domains which may be suspect, or other means of collecting the input.

Process 100 may continue by collecting the input data 103 from any feeder sources and run raw data through an initial filtering mechanism (task 104). Filtering is performed based on a DNS collection filtering configuration list 105 (filter 105) maintained manually or automatically. The filter 105 is used to limit the input data 103 from the task 102 to be free from DNS resolution information that has already been investigated and determined not to be suspicious. If the incoming DNS resolution information 103A of the input data 103 is marked to be filtered out (Yes branch of inquiry task 104), then it is ignored (task 106), otherwise (No branch of inquiry task 104), the input data 103 is normalized (task 108) to provide normalized input data.

The normalization task 108 converts the input data 103 into a standard form to provide the normalized input data that can be stored in a DNS information storage database 110. Exemplary normalized input data are shown in table 600 (FIG. 6) below.

The normalized input data from the DNS information storage database 110 is removed from the DNS information storage database 110 (task 124) usually on a time interval (e.g., all data arriving in the last 10 minutes) and is processed in parallel by both a URL-to-IP change-over-time detector (aka Single-Flux APT) (task 112) and an authoritative DNS server change-over-time detector (aka Double-Flux APT) (task 114). Tasks 112 and 114 are shown below in more detail in the context of discussion of FIGS. 3 and 4 respectively.

Process 100 may continue by providing output data (task 116). The output data or event list may comprise, for example but without limitation, data in a form of security events that indicate that specific URLs, specific Domains, or both a specific URL and a specific Domain, are suspected as being part of an APT botnet. A botnet is a collection of internet-connected programs communicating with other similar programs in order to perform tasks.

Output data from the tasks 112 and 114 comprise both event lists and tracking data. The tracking data for suspicious URL is stored in a suspicious URL storage database 118 as shown in an exemplary table 700 (FIG. 7) below. The tracking data for suspicious DNS domain is stored in an authoritative DNS storage database 120 as shown in an exemplary table 800 (FIG. 8).

Process 100 may then continue by identifying overlapping findings (task 122) from the Single-Flux detector (task 112) and the Double-Flux detector (task 114). The suspicious URL storage database 118 and the authoritative DNS storage database 120 provide input to the task 122 to identify overlapping findings from the Fast-Flux and Double-Flux detectors which then may output additional event list (task 116) items.

Process 100 may continue by database cleanup processes (tasks 124, 126 and 128) as explained in more detail in the context of discussion of FIG. 2 below. The database cleanup processes tasks 124, 126 and 128 keep the data in their respective storages trimmed and storing only appropriate data.

Figure 2:
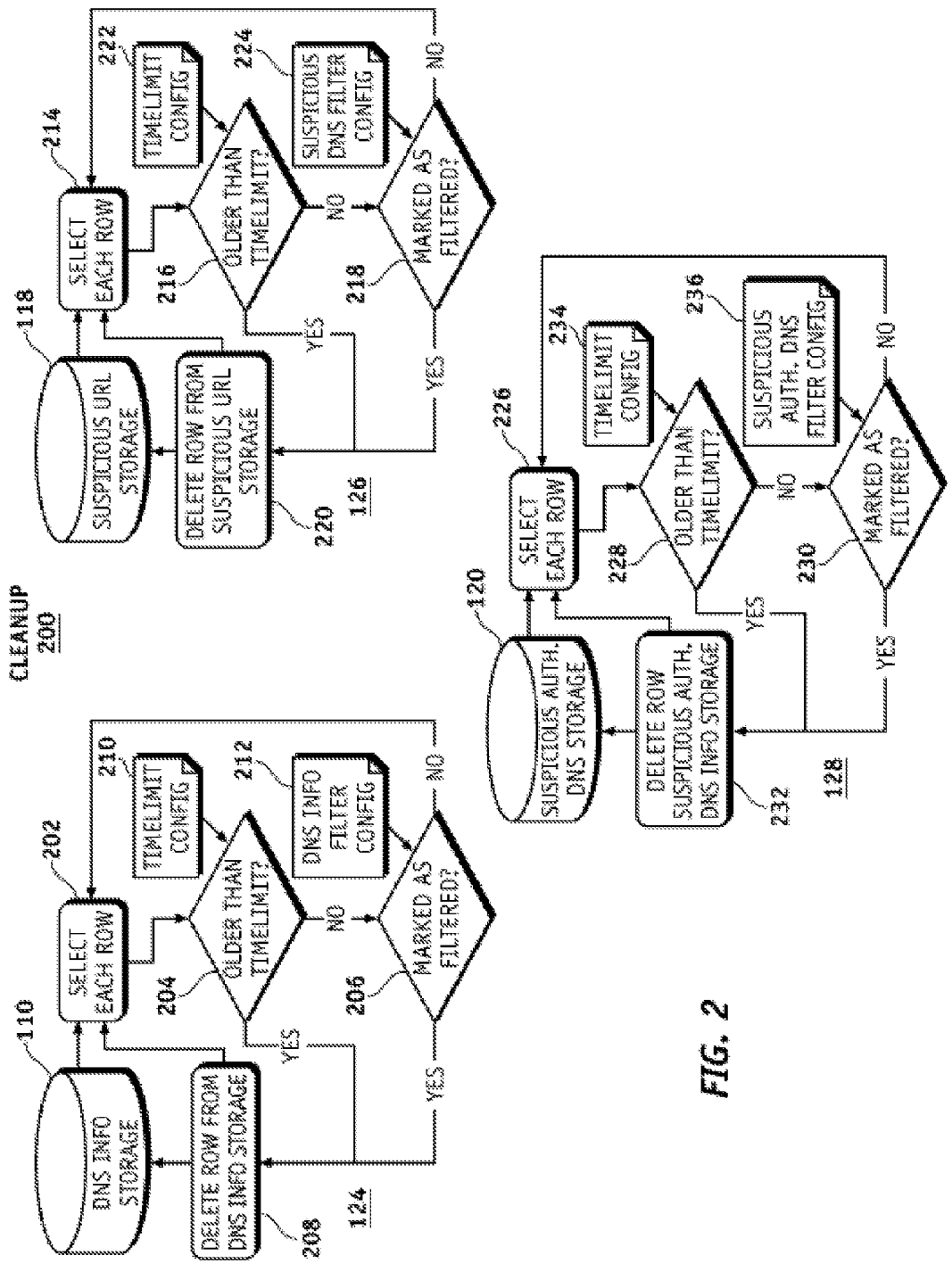
FIG. 2 is an illustration of an exemplary flowchart showing a clearing process of the Fast-Flux malware detection process of FIG. 1 in more detail according to an embodiment of the disclosure.

FIG. 2 is an illustration of an exemplary flowchart showing a clearing (cleanup) process 200 of the Fast-Flux malware detection process 100 of FIG. 1 in more detail according to an embodiment of the disclosure. The clearing process 200 performs the tasks 124, 126, and 128 of the detection process 100 to keep the data trimmed and stores only appropriate data in the three respective storage databases 110, 118, and 120. The same process is used for each of the tasks 124, 126, 128.

All data is reviewed one element (row) at a time (202, 214, and 226). Each element (row) is checked to determine it is older than a time limit (inquiry tasks 204, 216, and 228). The time limit (210, 222, and 234) may be configured manually. For example but without limitation, a nominal time limit may be configured to keep data no more than 12 months, or other time limit. If the element is older than the time limit (Yes branch of inquiry tasks 204, 216, and 228) then that row is deleted (removed) from the storage (tasks 208, 220, and 232). If the element is not older than the time limit (No branch of inquiry tasks 204, 216, and 228) then it is further compared (inquiry tasks 206, 218, and 230) to a list of known non-suspicious URLs and non-suspicious domains and/or non-suspicious authoritative DNS servers (212, 224, and 236). If the data element (row) from the data storage contains information that is now believed to be no longer suspicious (i.e., marked as now filtered, Yes branch of inquiry tasks 206, 218, and 230) then the data element (row) is deleted (removed) from the data store (tasks 208, 220, 232).

Figure 3:
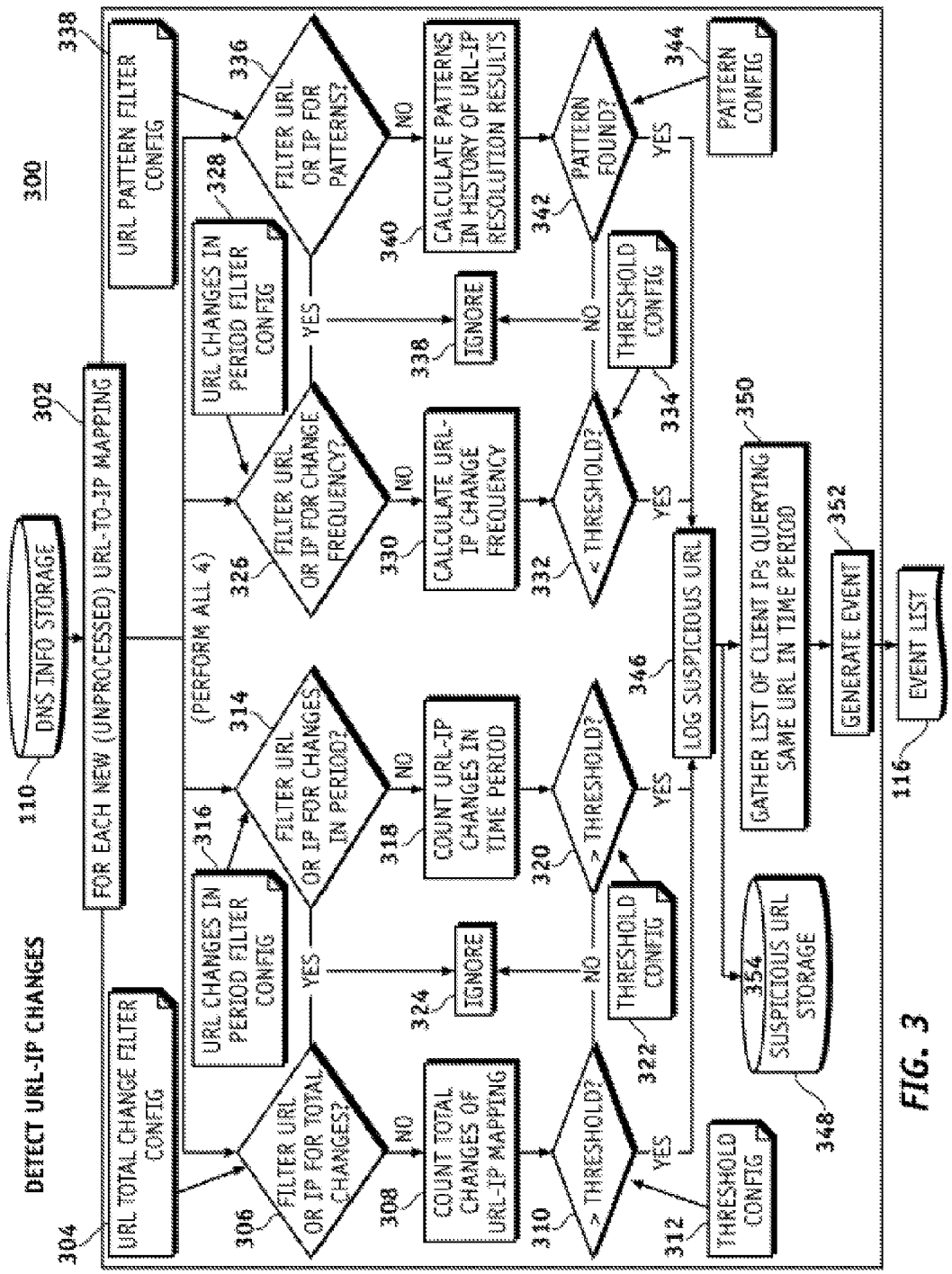
FIG. 3 is an illustration of an exemplary flowchart showing a Single-Flux URL-IP changes detection process of the Fast-Flux malware detection process of FIG. 1 in more detail according to an embodiment of the disclosure.

FIG. 3 is an illustration of an exemplary flowchart showing a Single-Flux URL-IP changes detection process 300 of the Fast-Flux malware detection process 100 of FIG. 1 in more detail according to an embodiment of the disclosure.

Process 300 may begin by collecting a list (task 302) of all of the new URL-IP associations added to the DNS information storage database 110 since the last time the processing was performed (or, in the case that processing is continually being performed, the next newest result from the storage). For each result retrieved, a series of actions and analysis is then performed based on the data provided by the result and the historical data stored (from other results) in order to determine whether a change in the IP address for the URL is suspicious (or not) as explained below.

For each new result, data is passed in parallel to four different processes: total quantity of URL-to-IP association changes (tasks 306-312), quantity of URL-to-IP association changes in a time period (tasks 314-322), frequency of URL-to-IP association changes (tasks 326 to 334), and patterns of URL-to-IP association changes (tasks 336 to 342).

Each URL-to-IP mapping data element such as a row 602 in the table 600 (FIG. 6) is checked at inquiry task 306 to determine if the total quantity of changes detection should be performed for this URL and/or IP. This additional filtering step allows restrictions to be placed on results for only this type of detection, not all detections. This filter is controlled from a filter list 304 that may be manually controlled. If this result is filtered out (Yes branch of inquiry task 306) then it is ignored (task 324) and process 300 continues with the next new item (new URL-TO-IP-mapping) (task 302). If the result is not filtered out (No branch of inquiry task 306) then an entire storage history from the DNS information storage database 110 is searched for other occurrences where the URL is a match, and a number of results returned are counted counting a total number of association changes (total number of URL-IP Mapping changes) (task 308) and compared to a configured total-association-change-threshold (inquiry task 310) for this type of detection.

The total-association-change-threshold configuration (312) is suitably set for operation of the system 900. For example but without limitation, total-association-change-threshold may be 500 changes (e.g., where the total stored timeframe is 12 months). Total changes may be loosely dependent on a total timeframe for data stored. If the number of results (number of total changes) (task 308) is greater than the total-association-change-threshold (Yes branch of inquiry task 310), the process 300 proceeds to task 346 and logs suspicious URL data to provide a suspicious resource log.

Each URL-to-IP mapping data element such as the row 602 in table 600 is checked at inquiry task 314 to determine if the quantity of changes within a time period detection should be performed for this URL and/or IP. This additional filtering step allows restrictions to be placed on results for only this type of detection, not all detections. This filter is controlled from a filter list 316 that may be manually controlled. If this result is filtered out (Yes branch of inquiry task 314), then it is ignored (task 324) and process 300 continues with the next new item (task 302). If the result is not filtered out (No branch of inquiry task 314), then the entire storage history from the DNS information storage database 110 is searched for other occurrences where the URL is a match, and the number of results returned are counted, counting a number of association changes in a time-period (task 318) and compared to a configured time-period-association-changes-threshold (inquiry task 320) for this type of detection.

The time-period-association-changes-threshold (322) is suitably set for operation of the system 900. For example but without limitation, the time-period-association-changes-threshold may be 50 changes for a 1 hour time period. The threshold is a single value against which a number of changes is compared. If the number of results (task 318) is greater than the time-period-association-changes-threshold (Yes branch of inquiry task 320), the process 300 proceeds to task 346.

Each URL-to-IP mapping data element such as the row 602 in the table 600 is checked at inquiry task 326 to determine if the frequency of changes detection should be performed for this URL and/or IP. This additional filtering step allows restrictions to be placed on results for only this type of detection, not all detections. This filter is controlled from a filter list 328 that may be manually controlled. If this result is filtered out (Yes branch of inquiry task 326) then it is ignored (task 352) and process 300 continues with the next new item (task 302). If the result is not filtered out (No branch of inquiry task 326) then the entire storage history is searched for other occurrences where the URL is a match, and the frequency of changes of the URL-to-IP mapping is calculated calculating an association change frequency (task 330) and compared to a configured association-change-frequency-threshold (inquiry task 332) for this type of detection.

The association-change-frequency-threshold 334 is suitably set for operation of the system 900. For example, but without limitation, the association-change-frequency-threshold may be 5 minutes, indicating that a change of the URL-to-IP mapping occurs usually more frequently than once every 5 minutes. This change frequency may be represented in a different manner, but the association-change-frequency-threshold 334 may indicate a limit on how often the change occurs, and results pass the association-change-frequency-threshold 334 if the change of the URL-to-IP mapping occurs more often than the association-change-frequency-threshold 334 specifies. If the frequency of changes of the URL-to-IP mapping (task 330) is less than the association-change-frequency-threshold 334 (Yes branch of inquiry task 332), the process 300 proceeds to task 346.

Each URL-to-IP mapping data element such as the row 602 in table 600 is checked at inquiry task 336 to determine if the patterns of changes of URL-to-IP association detection should be performed for this URL and/or IP. This additional filtering step allows restrictions to be placed on results for only this type of detection, not all detections. This filter is controlled from a filter list 338 that may be manually controlled. If this result is filtered out (Yes branch of inquiry task 336) then it is ignored (task 338) and process 300 continues with the next new item (task 302). If the result is not filtered out (No branch of inquiry task 336) then the entire storage history from the DNS information storage database 110 is searched for any items that match the URL (task 340). The found items are organized chronologically and examined to determine if a pattern, or patterns, is present (inquiry task 342).

A pattern configuration 344 is suitably set for operation of the system 900. For example, but without limitation, the pattern configurations 344 may be a consistent amount of time between changes in the URL-IP resolution, or other pattern. If the pattern, or patterns, are present (Yes branch of inquiry task 342), the process 300 proceeds to task 346.

For each result path reaching process 300 logs suspicious URL data (task 346) in suspicious resource log, stores suspicious URL in the suspicious URL storage 354 (task 348) for later use. Then process 300 searches the entire DNS information storage database 110 and retrieves a list of all client devices that have queried this suspicious URL within a time period (task 350). This provides information if there were more than one infected client device that is performing the same suspicious access. This data is then provided to an event generation process (task 352) which will consolidate detected suspicious URLs so that there are not unnecessary duplicate events generated to the external event list (task 116).

Figure 4:
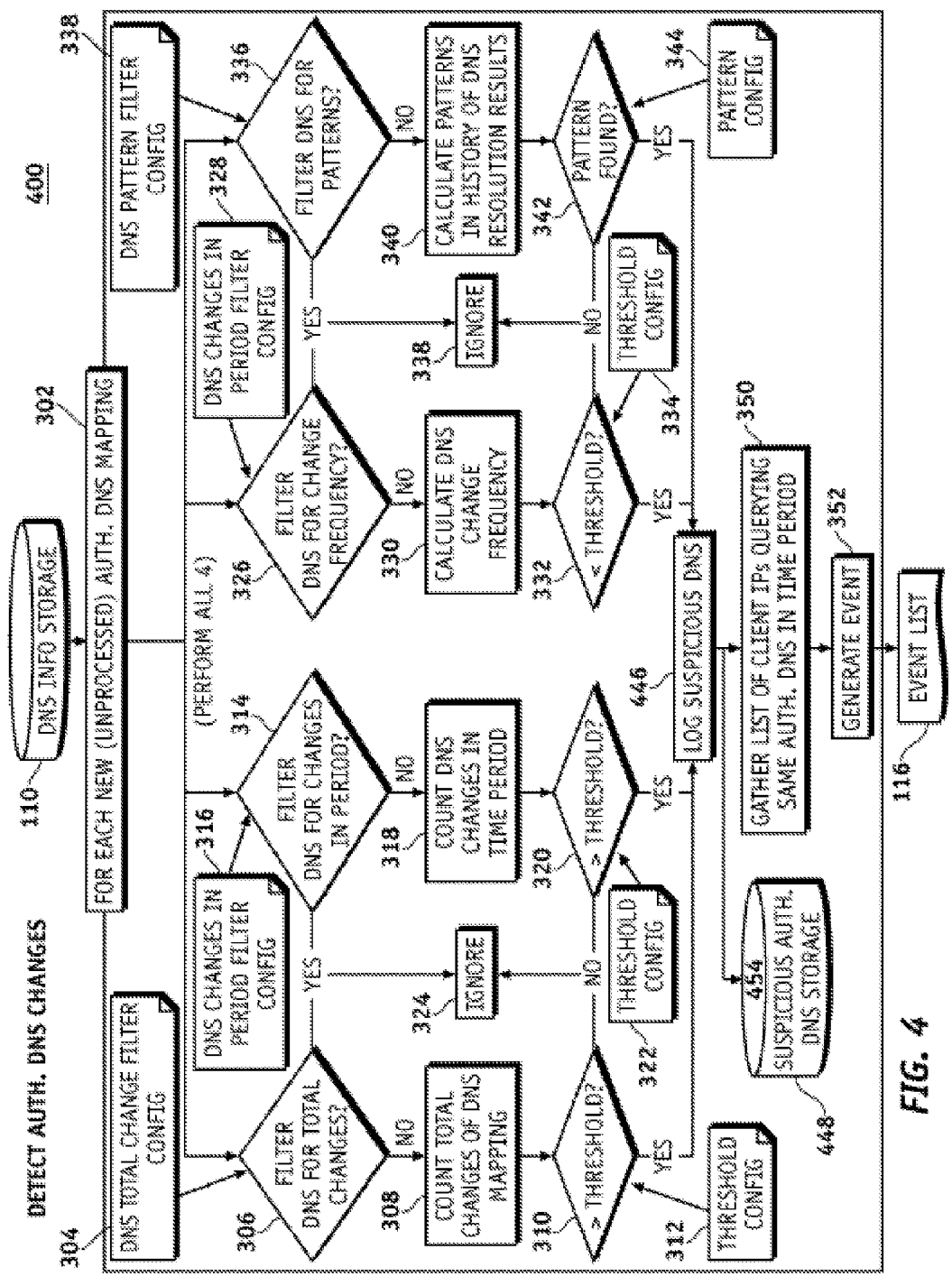
FIG. 4 is an illustration of an exemplary flowchart showing a Double-Flux authoritative DNS changes detection process of the Fast-Flux malware detection process of FIG. 1 in more detail according to an embodiment of the disclosure.

FIG. 4 is an illustration of an exemplary flowchart showing a Double-Flux authoritative DNS changes detection process 400 of the Fast-Flux malware detection process of FIG. 1 in more detail according to an embodiment of the disclosure. Process 400 may have functions, material, and structures that are similar to the embodiments shown in process 300. Therefore common features, functions, and elements may not be redundantly described here. The principal difference between process 300 and 400 is that the process 400 is performed using an association between a Domain and an authoritative DNS server location address (such as IP).

Instead of the URLs, process 400 uses Domains, and instead of device IP addresses corresponding to the URLs, a location address of the authoritative DNS server is used. The process 400 uses data similar to process 300 such as input and output events as well as inserting information about suspicious domains into a storage database. So process 400 is not redundantly described herein.

For example, process 400 configures a resource association list comprising the DNS Domain-to-DNS server associations list instead of URL-to-IP associations list configured by the process 300. Process 400 configures a suspicious DNS log instead of a suspicious URL log configured by the process 300.

Figure 5:
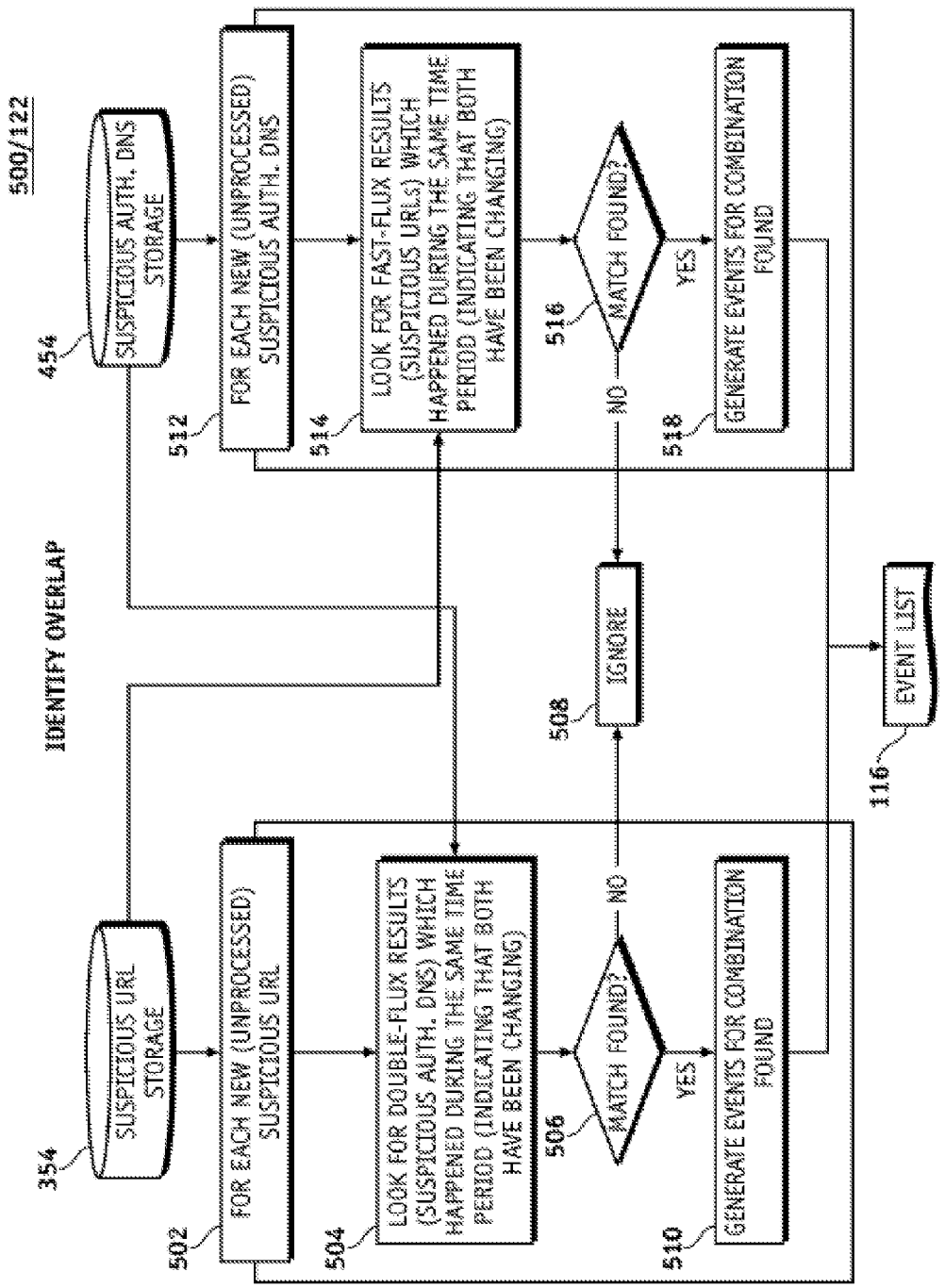
FIG. 5 is an illustration of an exemplary flowchart showing an identifying overlap process of the Fast-Flux malware detection process of FIG. 1 in more detail according to an embodiment of the disclosure.

FIG. 5 is an illustration of an exemplary flowchart showing the overlap identifying process 500/122 of the Fast-Flux detection process of FIG. 1 in more detail according to an embodiment of the disclosure. The process 122 identifies Single-Flux URL and Double-Flux authoritative DNS server domain overlap. The process 122 uses the suspicious URL storage 354 outputted in the process 300 and the suspicious authoritative DNS storage 454 outputted in the process 400 as input and produces the event list 116 for use by the external systems.

The process 122 may begin by gathering a list of new (unprocessed) items from the suspicious URL storage 354 (task 502) and from the suspicious authoritative DNS storage 454 (task 512) and iterating through each item.

For each suspicious URL items from the task 502 a search is performed in the suspicious authoritative DNS storage 454 for Double-Flux results which occurred during the same time period that the URL was considered suspicious (task 504). Finding both at the same time indicates that both the URL and the domain underwent changes during the same period of time, indicating that both single-Flux and Double-Flux actions were active. If a match is not found (No branch of inquiry task 506) then this element is ignored (task 508) and process 122 continues processing with the next element. If a match is found (Yes branch of inquiry task 506) then combine all known data and generate an event for combination found (task 510) to be output to an external event list (task 116).

For the suspicious domain items from task 512 a search is performed in the suspicious URL storage 354 for Single-Flux results which occurred during the same time period that the domain was considered suspicious (task 514). Finding both at the same time indicates that both the domain and URL underwent address changes during the same period of time, indicating that both Double Flux and Single Flux actions were active. If a match is not found (No branch of inquiry task 516) then this element is ignored (task 508) and process 122 continues with the next element. If a match is found (Yes branch of inquiry task 516) then process 122 combine all known data and generate an event for the combination found (task 518) to be output to the external event list (task 116).

FIG. 6 is an illustration of an exemplary table 600 showing possible raw storage results for use with Single-Flux and Double-Flux tracking according to an embodiment of the disclosure. The table 600 shows an example of a possible storage solution for storing the DNS data in DNS information storage database 110. Row 602 shows exemplary normalized records stored in the DNS information storage database 110. Other database formats and data suitable for operation of system 900 may also be used to generate the table 600.

FIG. 7 is an illustration of an exemplary table 700 showing data in a suspicious URLs storage according to an embodiment of the disclosure. The table 700 provides an example of a possible storage solution for the list of suspicious URL storage database 118 and 354. Other database formats and data suitable for operation of system 900 may also be used to generate the table 700.

FIG. 8 is an illustration of an exemplary table showing data in a suspicious DNS domain storage according to an embodiment of the disclosure. The table 800 shows an example of a possible storage solution for the list of the tracking data for suspicious DNS domains stored in the authoritative DNS storage database 120 and 448. Other database formats and data suitable for operation of system 900 may also be used to generate the table 800.

Figure 9:
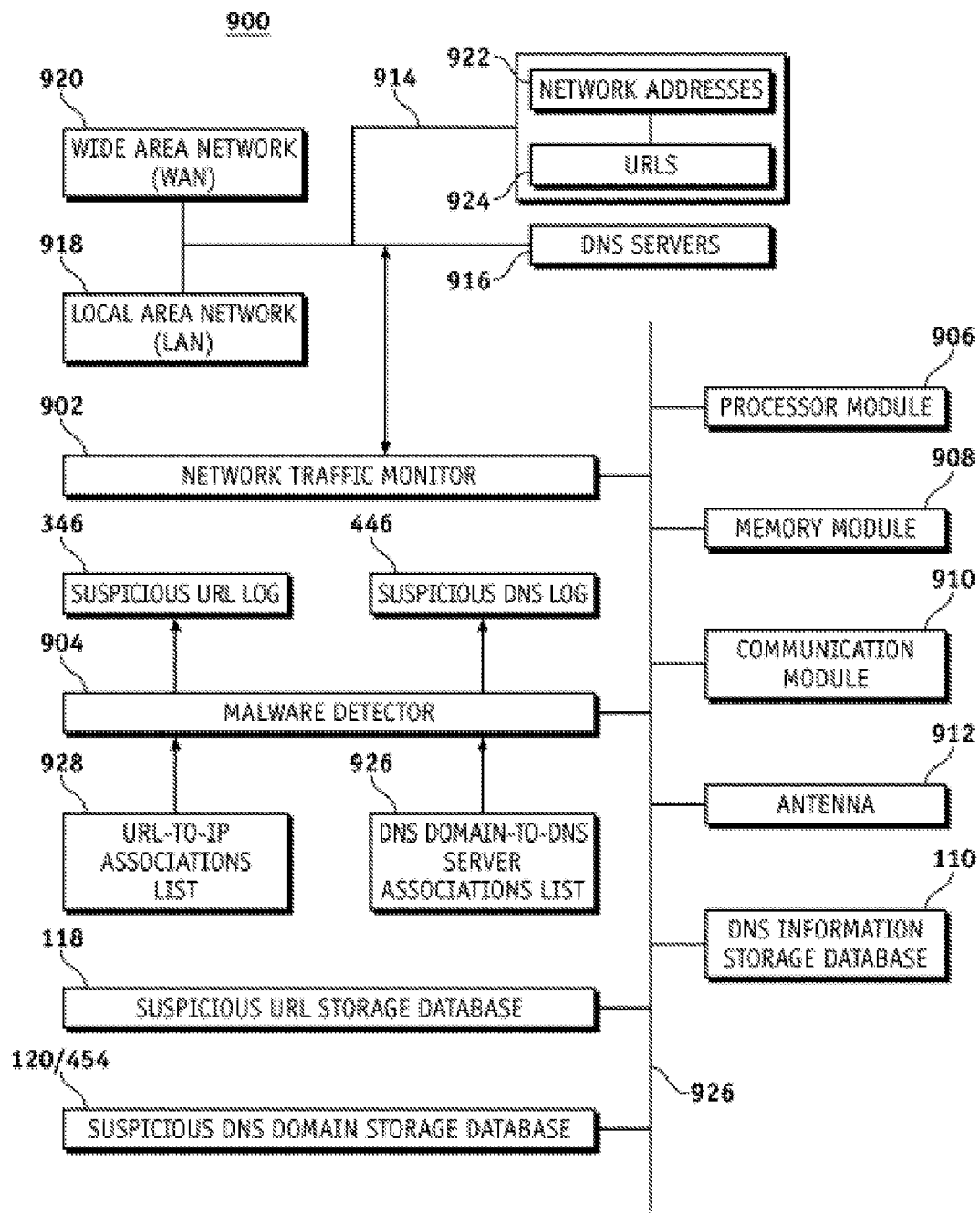
FIG. 9 is an illustration of an exemplary functional block diagram of a Fast-Flux malware detection system according to an embodiment of the disclosure.

FIG. 9 is an illustration of an exemplary functional block diagram of a Fast-Flux detection system 900 according to an embodiment of the disclosure. The Fast-Flux detection system 900 may comprise: a network traffic monitor 902, a malware detector 904, a processor module 906, a memory module 908, and a communication module 910.

The network traffic monitor 902 is configured to monitor a plurality of domain name system (DNS) lookup requests 914 to one or more DNS servers 916 from a local area network (LAN) 918 to a wide area network (WAN) 920, the DNS lookup requests 914 comprising a plurality of requests to resolve one or more uniform resource locators (URLs) to one or more received network addresses (e.g., internet protocol (IP) addresses). The network traffic monitor 902 is further configured to monitor the received network addresses (IP) 922 received for the URLs 924 from the DNS servers 916 for the DNS lookup requests 914 to provide a URL-to-IP associations list 928. The received network addresses (IP) 922 may comprise, for example but without limitation, an internet protocol address, an Ethernet address, or other network address. The network traffic monitor 902 is further configured to monitor the DNS servers 916 used for the DNS lookup requests 914 for the URLs 924 to provide a DNS Domain-to-DNS server associations list 926.

The malware detector 904 is configured to generate the suspicious URL log 346 based on the URL-to-IP associations list 928 and the suspicious DNS log 446 based on the DNS Domain-to-DNS server associations list 926 and indicate a presence of a malware program in the LAN 918 based on the suspicious URL log 346 and the suspicious DNS log 446.

The processor module 906 comprises processing logic that is configured to carry out the functions, techniques, and processing tasks associated with the operation of the system 900. In particular, the processing logic is configured to support the system 900 described herein. For example, the processor module 906 may direct the network traffic monitor 902 and the malware detector 904 in the system 900.

The processor module 906 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 908 may comprise a data storage area with memory formatted to support the operation of the system 900. The memory module 908 is configured to store, maintain, and provide data as needed to support the functionality of the system 900. For example but without limitation, the memory module 908 may store data, such as but without limitation, the network address 922, the suspicious URL storage database 118, the suspicious DNS domain storage database 120/454, the suspicious URL log 346, the suspicious DNS log 446, the URL-to-IP list 928, the DNS-To-DNS server association list 926, time, date, frequency, pattern, or other data.

In some embodiments, the memory module 908 may comprise, for example but without limitation, a non-volatile storage device (e.g., non-volatile semiconductor memory, hard disk device, optical disk device, and the like), a random access storage device (for example, SRAM, DRAM), or any other form of non-transitory storage medium known in the art.

Additionally, the memory module 908 may represent dynamically updating databases containing tables for updating the databases, and the like. The memory module 908 may also store, a computer program that is executed by the processor module 906, an operating system, an application program, tentative data used in executing a program, or other application.

The memory module 908 may be coupled to the processor module 906 such that the processor module 906 can read information from and write information to the memory module 908. For example, the processor module 906 may access the memory module 908 to access the data stored in the memory module 908 as explained above.

As an example, the processor module 906 and memory module 908 may reside in respective application specific integrated circuits (ASICs). The memory module 908 may also be integrated into the processor module 906. In an embodiment, the memory module 908 may comprise a cache memory for storing temporary variables or other intermediate information during execution of instructions to be executed by the processor module 906.

The communication module 910 is operable to transmit and receive a plurality of communication signals comprising data signals via a transceiver (not shown) under control of the processor module 906. The communication module 910 operates with an antenna 912 to carry out a radio communication with a network side device via a base station communicatively coupled to a wireless communication network (not shown).

The communication module 910 can transmit a signal from the processor module 906 as a transmitted radio signal to a base station through the antenna 912, and can demodulate a received radio signal received from the base station through the antenna 912. The processor module 906 receives a demodulated signal form the communication module 910.

The communication module 910 may also comprise an Ethernet/USB communication module (not shown) configured to provide communication between the system 900 and the electronic resources via Ethernet. The Ethernet/USB communication module communicates with the Internet through an access port to download documents, and to interact with Web-based services.

Those skilled in the art will understand that the various illustrative blocks, modules, circuits, and processing logic described in connection with the embodiments disclosed herein may be implemented in hardware, computer-readable software, firmware, or other combination thereof. To clearly illustrate this interchangeability and compatibility of hardware, firmware, and software, various illustrative components, blocks, modules, circuits, and steps are described generally in terms of their functionality.

In some embodiments, the system 900 may comprise any number of processor modules, any number processing modules, any number of memory modules, any number of transmitter modules, and any number of receiver modules suitable for their operation described herein. The illustrated system 900 depicts a simple embodiment for ease of description. These and other elements of the system 900 are interconnected together, allowing communication between the various elements of system 900. In one embodiment, these and other elements of the system 900 may be interconnected together via a respective data communication bus 926.

A transmitter module and a receiver module may be located in the processor module 906 coupled to a shared antenna 912. Although in a simple module only one shared antenna 912 may be provided, more sophisticated modules may be provided with multiple and/or more complex antenna configurations. Additionally, although not shown in this FIG. 9, those skilled in the art will recognize that a transmitter may transmit to more than one receiver, and that multiple transmitters may transmit to a same receiver.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

Figure 10:
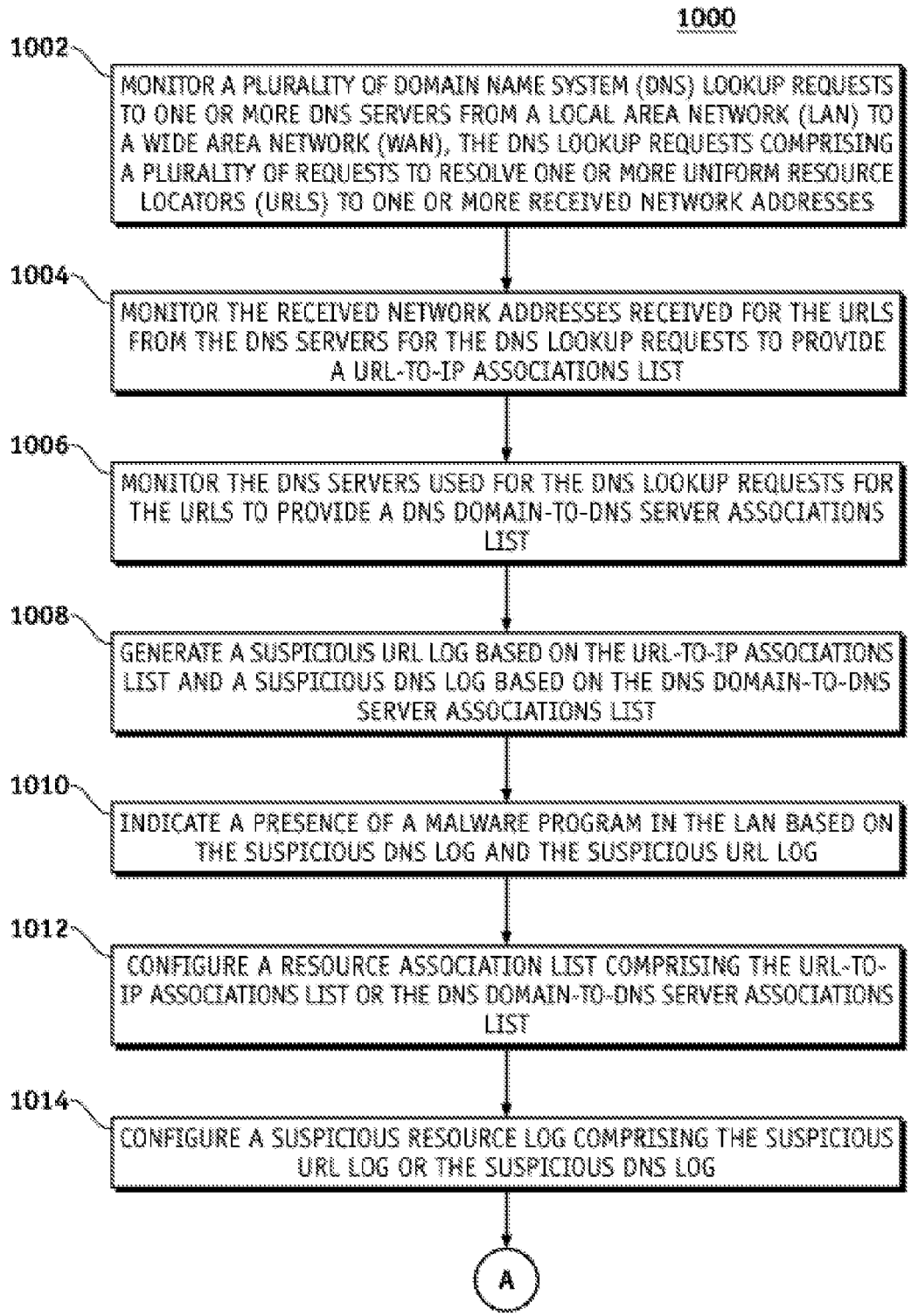
FIG. 10 is an illustration of an exemplary flowchart showing a Fast-Flux malware detection process according to an embodiment of the disclosure.
Figure 10:
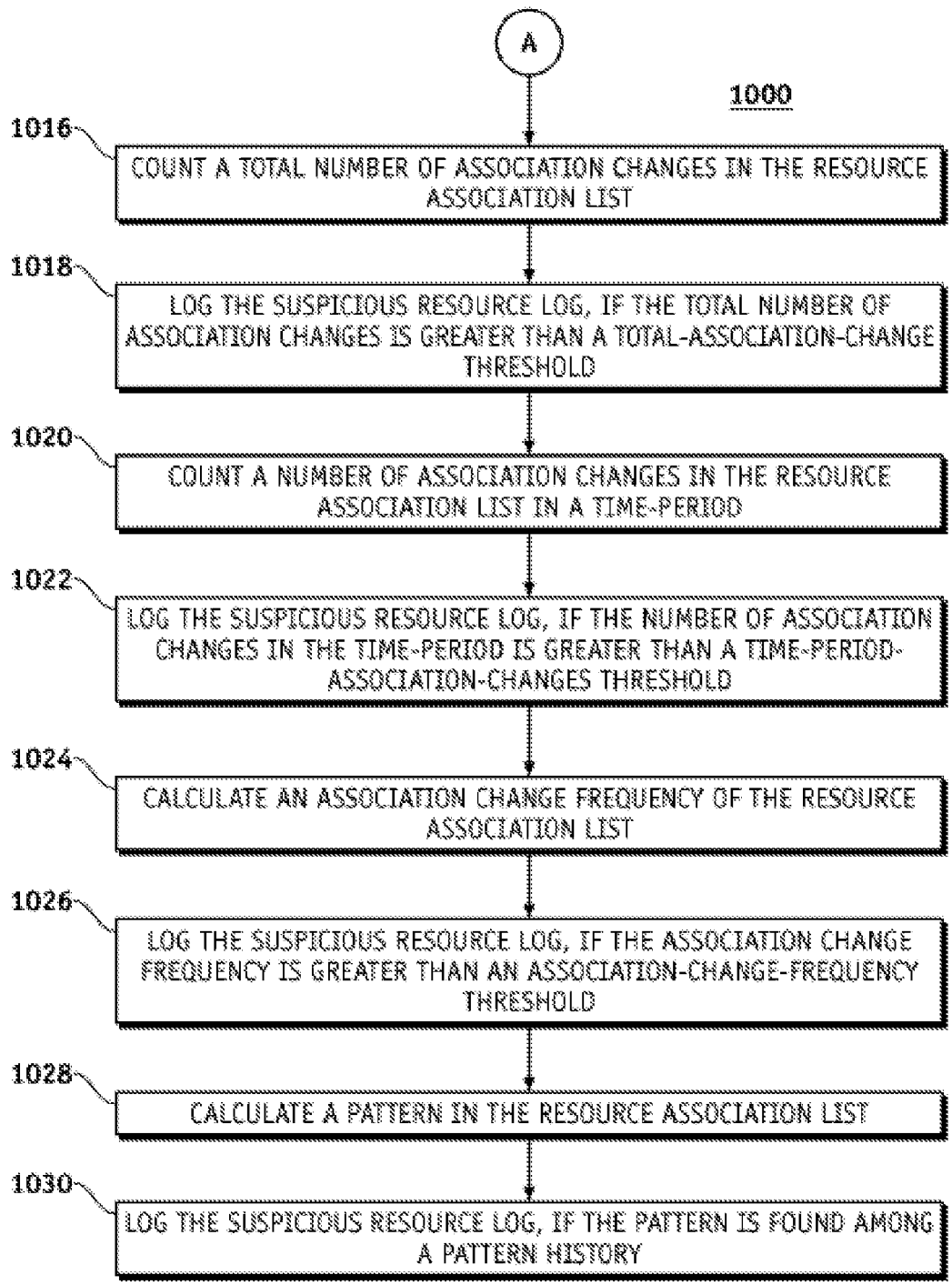

FIG. 10 is an illustration of an exemplary flowchart showing a Fast-Flux malware detection process (process 1000) according to an embodiment of the disclosure. The various tasks performed in connection with process 1000 may be performed mechanically, by software, hardware, firmware, computer-readable software, computer readable storage medium, or any combination thereof. It should be appreciated that process 1000 may include any number of additional or alternative tasks, the tasks shown in FIG. 10 need not be performed in the illustrated order, and the process 1000 may be incorporated into a more comprehensive procedure or process having additional functionality not described in detail herein.

For illustrative purposes, the following description of process 1000 may refer to elements mentioned above in connection with FIG. 9. In some embodiments, portions of the process 1000 may be performed by different elements of the system 900 such as: the network traffic monitor 902, the malware detector 904, the processor module 906, the memory module 908, the communication module 910, etc. It should be appreciated that process 1000 may include any number of additional or alternative tasks, the tasks shown in FIG. 2 need not be performed in the illustrated order, and the process 1000 may be incorporated into a more comprehensive procedure or process having additional functionality not described in detail herein.

Process 1000 may begin by monitoring a plurality of domain name system (DNS) lookup requests to one or more DNS servers from a local area network (LAN) to a wide area network (WAN), the DNS lookup requests comprising a plurality of requests to resolve one or more uniform resource locators (URLs) to one or more received network addresses (IP) (task 1002).

Process 1000 may continue by monitoring the received network addresses (IP) received for the URLs from the DNS servers for the DNS lookup requests to provide a URL-to-IP associations list (task 1004).

Process 1000 may continue by monitoring the DNS servers used for the DNS lookup requests for the URLs to provide a DNS Domain-to-DNS server associations list (task 1006).

Process 1000 may continue by generating a suspicious URL log based on the URL-to-IP associations list and a suspicious DNS log based on the DNS Domain-to-DNS server associations list (task 1008).

Process 1000 may continue by indicating a presence of a malware program in the LAN based on the suspicious DNS log and the suspicious URL log (task 1010).

Process 1000 may continue by configuring a resource association list comprising the URL-to-IP associations list or the DNS Domain-to-DNS server associations list (task 1012).

Process 1000 may continue by configuring a suspicious resource log comprising the suspicious URL log or the suspicious DNS log (task 1014).

Process 1000 may continue by counting a total number of association changes in the resource association list (task 1016).

Process 1000 may continue by logging the suspicious resource log, if the total number of association changes is greater than a total-association-change threshold (task 1018).

Process 1000 may continue by counting a number of association changes in the resource association list in a time-period (task 1020).

Process 1000 may continue by logging the suspicious resource log, if the number of association changes in the time-period is greater than a time-period-association-changes threshold (task 1022).

Process 1000 may continue by calculating an association change frequency of the resource association list (task 1024).

Process 1000 may continue by logging the suspicious resource log, if the association change frequency is greater than an association-change-frequency threshold (task 1026).

Process 1000 may continue by calculating a pattern in the resource association list (task 1028).

Process 1000 may continue by logging the suspicious resource log, if the pattern is found among a pattern history (task 1030).

In this manner, a system and method are provided to identify Single-Flux and Double-Flux networks with the purpose of identifying internally infected network devices, which is a task that is not being performed by existing systems. Embodiments of the disclosure detect APT computer malware by examining and tracking URL-to-IP resolution requests as well as the authoritative DNS servers which are providing the URL resolutions. By searching for changes in the pairings, embodiments identify the URLs and DNS servers most likely involved in a Fast-Flux malware network.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 9 depicts example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 906 to cause the processor module 906 to perform specified operations. Such instructions, generally referred to as "computer program code" or "program code" (which may be grouped in the form of computer programs or other groupings), when executed, enable the system 900.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:
1. A method, comprising:
   monitoring, by a computing device, a plurality of domain name system (DNS) lookup requests to one or more DNS servers initiated by one or more network devices in a local area network (LAN) to a wide area network (WAN), the DNS lookup requests comprising a plurality of requests to resolve one or more uniform resource locators (URLs) to one or more received network addresses (IP);

monitoring the one or more received network addresses (IP) resolved for the one or more URLs to provide a URL-to-IP associations list, wherein the URL-to-IP associations list is configured to store one or more suspicious URLs;

generating a suspicious URL log based on the URL-to-IP associations list, wherein the suspicious URL log comprises a first suspicious URL;

determining a list of client devices that queried the first suspicious URL during a first time period; and generating an event related to a single-flux action being active based on the list of client devices.

2. The method of claim 1, further comprising indicating a presence of a malware program in the LAN based on the suspicious URL log.

3. The method of claim 1, further comprising:
configuring a resource association list comprising the URL-to-IP associations list; and
configuring a suspicious resource log comprising the suspicious URL log.

4. The method of claim 3, further comprising:
counting a total number of association changes in the resource association list; and
logging the suspicious resource log, if the total number of association changes is greater than a total-association-change threshold.

5. The method of claim 3, further comprising:
counting a number of association changes in the resource association list in a time-period; and
logging the suspicious resource log, if the number of association changes in the time-period is greater than a time-period-association-changes threshold.

6. The method of claim 3, further comprising:
calculating an association change frequency of the resource association list; and
logging the suspicious resource log, if the association change frequency is greater than an association-change-frequency threshold.

7. The method of claim 3, further comprising:
calculating a pattern in the resource association list; and
logging the suspicious resource log, if the pattern is found among a pattern history.

8. A method, comprising:
monitoring by a network traffic monitor a plurality of domain name system (DNS) lookup requests to one or more DNS servers initiated by one or more network devices in a local area network (LAN) to a wide area network (WAN), the DNS lookup requests comprising a plurality of requests to resolve one or more uniform resource locators (URLs) to one or more received network addresses (IP);

monitoring the one or more DNS servers used for the DNS lookup requests for resolving the URLs to provide a DNS Domain-to-DNS server associations list;

generating a suspicious DNS log based on the DNS Domain-to-DNS server associations list, wherein the suspicious DNS log comprises a first suspicious DNS Domain;

determining a list of client devices that queried the first suspicious DNS Domain during a first time period; and generating an event related to a double-flux action being active based on the list of client devices.

9. The method of claim 8, further comprising indicating a presence of a malware program in the LAN based on the suspicious DNS log.

10. The method of claim 8, further comprising:
configuring a resource association list the DNS Domain-to-DNS server associations list; and
configuring a suspicious resource log comprising the suspicious DNS log.

11. The method of claim 10, further comprising:
counting a total number of association changes in the resource association list; and
logging the suspicious resource log, if the total number of association changes is greater than a total-association-change threshold.

12. The method of claim 10, further comprising:
counting a number of association changes in the resource association list in a time-period; and
logging the suspicious resource log, if the number of association changes in the time-period is greater than a time-period-association-changes threshold.

13. The method of claim 10, further comprising:
calculating an association change frequency of the resource association list; and
logging the suspicious resource log, if the association change frequency is greater than an association-change-frequency threshold.

14. The method of claim 10, further comprising:
calculating a pattern in the resource association list; and
logging the suspicious resource log, if the pattern is found among a pattern history.

15. A system, comprising:
at least one hardware processor; and
a non-transitory computer readable medium storing at least software that, when executed by the at least one hardware processor, cause the system to perform tasks comprising:
monitoring a plurality of domain name system (DNS) lookup requests to one or more DNS servers initiated by one or more network devices in a local area network (LAN) to a wide area network (WAN), the DNS lookup requests comprising a plurality of requests to resolve one or more uniform resource locators (URLs) to one or more received network addresses (IP);
monitoring the one or more received network addresses (IP) resolved for the one or more URLs to provide a URL-to-IP associations list, wherein the URL-to-IP associations list is configured to store one or more suspicious URLs;
generating a suspicious URL log based on the URL-to-IP associations list, wherein the suspicious URL log comprises a first suspicious URL;
determining a list of client devices that queried the first suspicious URL during a first time period; and
generating a first event related to a single-flux action being active based on the list of client devices.

16. The system of claim 15, wherein the tasks further comprise:
monitoring the one or more DNS servers used for the DNS lookup requests for resolving the URLs to provide a DNS Domain-to-DNS server associations list;
generating a suspicious DNS log based on the DNS Domain-to-DNS server associations list, wherein the suspicious DNS log comprises a first suspicious DNS Domain;
determining a list of client devices that queried the first suspicious DNS Domain during a first time period; and generating a second event related to a double-flux action being active based on the list of client devices.

17. The system of claim 15, further comprising indicating a presence of a malware program in the LAN based on the suspicious URL log.

18. The system of claim 15, further comprising:
configuring a resource association list comprising the URL-to-IP associations list; and
configuring a suspicious resource log comprising the suspicious URL log.

19. The system of claim 18, further comprising:
counting a total number of association changes in the resource association list; and
logging the suspicious resource log, if the total number of association changes is greater than a total-association-change threshold.

20. The system of claim 18, further comprising:
calculating a pattern in the resource association list; and
logging the suspicious resource log, if the pattern is found among a pattern history.

* * * * *